United States Patent
Ukidwe et al.

(10) Patent No.: US 10,717,862 B2
(45) Date of Patent: Jul. 21, 2020

(54) POLY(VINYL ACETAL) RESIN COMPOSITIONS, LAYERS, AND INTERLAYERS HAVING ENHANCED PROPERTIES

(71) Applicant: Solutia Inc., St. Louis, MO (US)

(72) Inventors: Nandan U. Ukidwe, Suffield, CT (US); Glenn Lewis Shoaf, Jonesborough, TN (US)

(73) Assignee: Solutia Inc., St. Louis, MO (US)

( * ) Notice: Subject to any disclaimer, the term of this patent is extended or adjusted under 35 U.S.C. 154(b) by 114 days.

(21) Appl. No.: 16/032,341

(22) Filed: Jul. 11, 2018

(65) Prior Publication Data

US 2020/0017674 A1 Jan. 16, 2020

(51) Int. Cl.
| | |
|---|---|
| *C08L 29/14* | (2006.01) |
| *C08K 5/11* | (2006.01) |
| *C08K 5/00* | (2006.01) |
| *B32B 17/10* | (2006.01) |
| *B32B 27/22* | (2006.01) |
| *B32B 27/30* | (2006.01) |

(52) U.S. Cl.
CPC ........ *C08L 29/14* (2013.01); *B32B 17/10761* (2013.01); *B32B 27/22* (2013.01); *B32B 27/306* (2013.01); *C08K 5/0016* (2013.01); *C08K 5/11* (2013.01); *B32B 2307/204* (2013.01); *C08L 2205/025* (2013.01)

(58) Field of Classification Search
CPC . B32B 27/22; B32B 27/306; B32B 17/10761; C08L 29/14; C08L 2205/025; C08K 5/11; C08K 5/0016
See application file for complete search history.

(56) References Cited

U.S. PATENT DOCUMENTS

| | | | |
|---|---|---|---|
| 2,282,026 A | 5/1942 | Bren et al. | |
| 2,282,057 A | 5/1942 | Hopkins et al. | |
| 5,190,826 A | 3/1993 | Asahina et al. | |
| 7,563,516 B2 | 7/2009 | Matsudo | |
| 8,470,908 B2 | 6/2013 | Frank | |
| 8,597,792 B2 | 12/2013 | Meise et al. | |
| 8,883,052 B2 | 11/2014 | Shimazumi et al. | |
| 8,920,930 B2 | 12/2014 | Meise et al. | |
| 9,248,626 B2 | 2/2016 | Lu | |
| 9,636,894 B2 | 5/2017 | Lu | |
| 9,669,605 B2 | 6/2017 | Ukidwe et al. | |

(Continued)

FOREIGN PATENT DOCUMENTS

WO WO 2014 157080 10/2014

OTHER PUBLICATIONS

Notification of Transmittal of the International Search Report and the Written Opinion of the International Searching Authority, or the Declaration dated Oct. 11, 2019 received in International Application No. PCT/US2019/039374.

(Continued)

*Primary Examiner* — Robert D Harlan
(74) *Attorney, Agent, or Firm* — Michelle Bugbee

(57) ABSTRACT

Resin compositions, layers, and interlayers comprising a poly(vinyl acetal) resin that includes residues of an aldehyde other than n-butyraldehyde are provided. Such compositions, layers, and interlayers can exhibit enhanced or optimized properties and lower VOC levels as compared to those formulated with comparable poly(vinyl n-butyral) resins.

12 Claims, 1 Drawing Sheet

(56) References Cited

U.S. PATENT DOCUMENTS

| | | |
|---|---|---|
| 9,724,899 B2 | 8/2017 | Ma |
| 9,758,662 B2 | 9/2017 | Ma |
| 9,926,431 B2 | 3/2018 | Ukidwe et al. |
| 9,976,024 B2 | 5/2018 | Ma |
| 2008/0242540 A1* | 10/2008 | Yoshizawa ............. B41M 5/395 503/201 |
| 2013/0022825 A1 | 1/2013 | Meise et al. |
| 2013/0148263 A1 | 6/2013 | Shimazumi |
| 2015/0044472 A1 | 2/2015 | Shimazumi et al. |
| 2016/0160029 A1 | 6/2016 | Lu et al. |
| 2017/0305125 A1 | 10/2017 | Ma |

OTHER PUBLICATIONS

Barnicki, S. D.; "Synthetic Organic Chemicals"; Handbook of Industrial Chemistry and Biotechnology; 2017; pp. 423-530.

Li, Yu-Gang et al.; "Trimerization of aldehydes with one α-hydrogen catalyzed by sodium hydroxide"; Chemical Papers 68 (3); 2014; pp. 422-426.

Wade, Bruce.; "Vinyl Acetal Polymers"; Encyclopedia of Polymer Science & Technology; 2016; 22 pages.

Zhou, Z. M. et al.; "Synthesis Characterization and Miscibility of Polyvinyl Butyrals of Varying Vinyl Alcohol Contents"; Turkish Journal of Chemistry; 21(4); Jan. 1997; pp. 229-238.

* cited by examiner

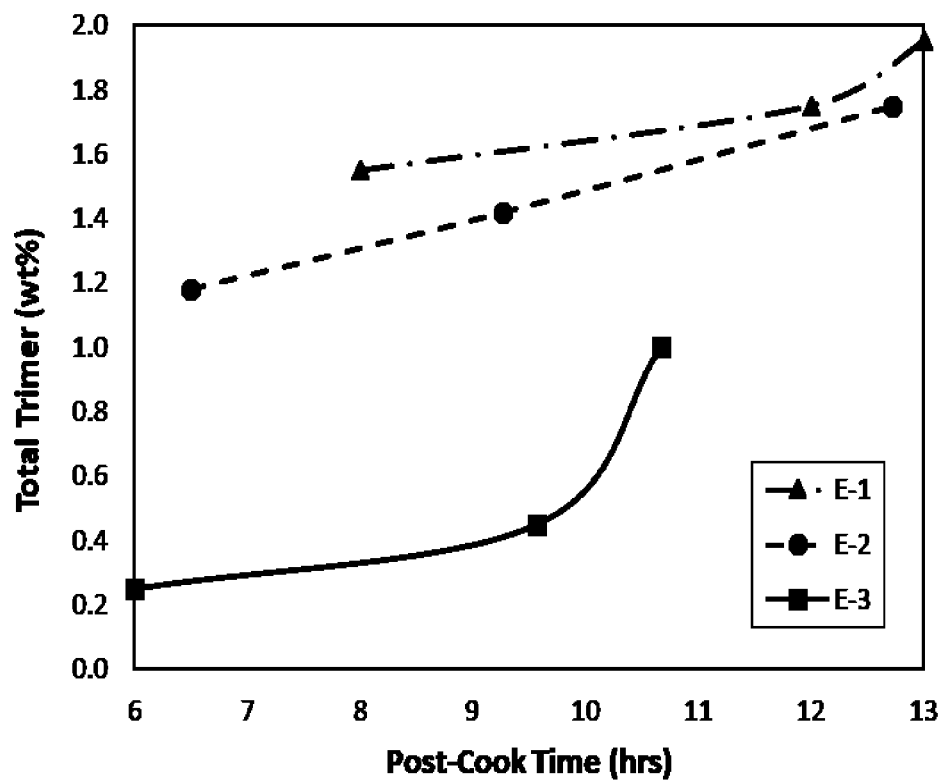

POLY(VINYL ACETAL) RESIN COMPOSITIONS, LAYERS, AND INTERLAYERS HAVING ENHANCED PROPERTIES

BACKGROUND

1. Field of the Invention

This disclosure relates to polymer resins and interlayers, in particular, to polymer resins suitable for use in polymer interlayers, including those utilized in multiple layer panels.

2. Description of Related Art

Poly(vinyl butyral) (PVB) is often used in the manufacture of polymer sheets that can be used as interlayers in multiple layer panels, including, for example, light-transmitting laminates such as safety glass or polymeric laminates. PVB is also used in photovoltaic solar panels to encapsulate the panels which are used to generate and supply electricity for commercial and residential applications.

Safety glass generally refers to a transparent laminate that includes at least one polymer sheet, or interlayer, disposed between two sheets of glass or other rigid substrate. Safety glass is often used as a transparent barrier in architectural and automotive applications, and one of its primary functions is to absorb energy resulting from impact or a blow without allowing penetration of the object through the glass and to keep the glass bonded even when the applied force is sufficient to break the glass. This prevents dispersion of sharp glass shards, which minimizes injury and damage to people or objects within an enclosed area. Safety glass may also provide other benefits, such as a reduction in ultraviolet (UV) and/or infrared (IR) radiation, and it may also enhance the aesthetic appearance of window openings through addition of color, texture, and the like. Additionally, safety glass with desirable sound insulation properties has also been produced, which results in quieter internal spaces.

Poly(vinyl acetal) resins typically include acetate pendant groups, hydroxyl pendant groups, and aldehyde pendant groups, such as n-butyraldehyde groups for a PVB resin, that are present along the vinyl polymer backbone. Properties of poly(vinyl acetal) resins are determined, in part, by the type(s) and relative amount of hydroxyl, acetate, and aldehyde groups and/or by the type and amount of plasticizer added to the resin. Therefore, selection of certain resin compositions and combination of those resins with various types and amount of plasticizers can provide resin compositions, layers, and interlayers having different properties.

However, such selections can have various drawbacks. For example, PVB resin compositions having high residual hydroxyl contents and low plasticizer contents tend to have higher glass transition temperatures, which make such resins desirable in safety performance applications. However, these resins exhibit very poor vibration dampening and sound attenuation performance. Similarly, PVB resin compositions having lower residual hydroxyl contents and higher amounts of plasticizer may exhibit good vibration and sound dampening properties, but typically have limited, if any, impact resistance over a broad temperature range.

Thus, a need exists for polymer resins that exhibit multiple desirable properties and that have mechanical, optical, and/or acoustic properties that can be adjusted as needed so that the resin can be utilized in a wide variety of applications. Additionally, a need exists for resin compositions, layers, and interlayers including such resins, which can be employed in several end uses, including in safety glass, structural applications and as polymeric laminates, and particularly, for resin compositions, layers and interlayers having lower volatile organic compounds and other impurities.

SUMMARY

One embodiment of the present invention concerns a poly(vinyl acetal) resin having a low level of volatile organic compounds having a residual hydroxyl content of less than 14 weight percent and comprising at least 90 weight percent of residues of at least one branched aldehyde having less than two α-hydrogens, based on the total weight of aldehyde residues of the poly(vinyl acetal) resin, wherein the poly (vinyl acetal) resin has less than 100 parts per million (by weight) of a self-aldol condensation product.

Another embodiment of the present invention concerns a resin layer comprising: a poly(vinyl acetal) resin having a low level of volatile organic compounds having a residual hydroxyl content of less than 14 weight percent and comprising at least 90 weight percent of residues of at least one branched aldehyde having less than two α-hydrogens, based on the total weight of aldehyde residues of the poly(vinyl acetal) resin, wherein the poly(vinyl acetal) resin has less than 100 parts per million (by weight) of a self-aldol condensation product, and a plasticizer.

Yet another embodiment of the present invention concerns a poly(vinyl acetal) resin having a low level of volatile organic compounds having a residual hydroxyl content of less than 14 weight percent and comprising at least 90 weight percent of residues of at least one branched aldehyde having less than two α-hydrogens, based on the total weight of aldehyde residues of the poly(vinyl acetal) resin, and wherein the aldehyde is iso-butyraldehyde or pivaldehyde, wherein the poly(vinyl acetal) resin has less than 100 parts per million (by weight) of a self-aldol condensation product.

Another embodiment of the invention concerns a multilayer glass panel comprising the resin layer of the invention.

Still another embodiment of the invention concerns a method of making the resin layer of the invention.

DESCRIPTION OF THE DRAWINGS

Various embodiments of the present invention are described in detail below with reference to the attached drawing FIGURES, wherein:

FIG. 1 is a graph showing the concentration of trimers in PVnB and PViB as a function of post-cook time in the reactor.

DETAILED DESCRIPTION

The present invention relates to polymer resin compositions, layers, and interlayers that include at least one poly (vinyl acetal) resin that exhibits different (and often improved) properties than a conventional poly(vinyl n-butyral) (PVB or PVnB) resin, but that can be used in many of the same applications as PVnB and in combination with conventional PVnB, including, for example, safety glass applications. As used herein, PVB and PVnB both refer to conventional poly(vinyl n-butyral) and may be used interchangeably throughout. Resins, compositions, layers, and interlayers according to various embodiments of the present invention may have different glass transition temperatures, different refractive indices, and/or different viscosities or other properties than comparable poly(vinyl acetal) resins that only include residues of n-butyraldehyde. As a result, the resins, compositions, layers, and interlayers described herein may also exhibit enhanced optical, mechanical, and/or acoustic performance. Methods for producing resins, compositions, layers, and interlayers having optimized properties according to various embodiments of the present invention are also described herein.

There is a need for resins, compositions and interlayers that are optically clear, have improved stiffness and rigidity and also have reduced volatile organic compounds ("VOCs") or other impurities. Also needed are resins, compositions and interlayers with both high flow and high stiffness or rigidity. Disclosed herein are interlayers and multiple layer panels having these and other improved properties.

It has been discovered that poly(vinyl acetal) resins made using branched aldehydes containing less than two α-hydrogens often result in resins with a lower concentration of VOCs, which are considered to be generally cleaner, have lower odor, and when extruded under oxidative conditions, lead to fewer edge bubbles and other defects in the resulting interlayer. These branched aldehydes not only improve the rheological properties of the polymer but also suppress unwanted side reactions that lead to formation of some of the VOCs. As used herein, a VOC is any organic compound having an initial boiling point less than or equal to 250° C. (482° F.) measured at a standard atmospheric pressure of 101.3 kPa.

Additionally, avoidance of side-products containing VOCs can also improve raw material yields and improve the unit cost of production by resulting in lower overall costs to make the resin. Low VOC polyvinyl acetal resins can be particularly desirable in other applications besides interlayers as well, such as coatings, inks, adhesives and the like due to the low VOC content.

In embodiments, the self-aldol condensation product is 2-ethyl-2-hexenal.

In embodiments, the poly(vinyl acetal) resin has a residual hydroxyl content of less than or equal to 13.5 weight percent, or less than or equal to 13.0 weight percent, or less than or equal to 12.5 weight percent, or less than or equal to 12.0 weight percent, or less than or equal to 11.5 weight percent.

In embodiments, the residues of at least one aldehyde other than n-butyraldehyde is iso-butyraldehyde or pivaldehyde.

In embodiments, the resin is used in a resin layer with a plasticizer. In embodiments, the plasticizer comprises a conventional plasticizer such as triethylene glycol di-(2-ethylhexanoate). In embodiments, the resin layer comprises a second plasticizer having polarity of greater than about 9.4, as defined by the formula 100×O/(C+H) with O, C and H being the number of oxygen, carbon and hydrogen atoms in the molecule.

In embodiments, the resin layer comprises a plasticizer such as triethylene glycol di-(2-ethylhexanoate) in an amount of at least 50 phr, and wherein the resin layer has a tan δ of at least 1.05. In another embodiment, the resin layer comprises a plasticizer such as triethylene glycol di-(2-ethylhexanoate) in an amount of at least 60 phr, and wherein the resin layer has a tan δ of at least 1.10, or the plasticizer is present in the resin layer in an amount of at least 70 phr and the resin layer has a tan δ of at least 1.15.

In embodiments, the resin layer comprises a blend of a conventional plasticizer (such as triethylene glycol di-(2-ethylhexanoate)) and another plasticizer with polarity greater than 9.4 (as defined by 100×O/(C+H)), and the blend of plasticizers is present in the resin layer in an amount of at least 60 phr, and the resin layer has a tan δ of at least 1.1. In another embodiment the blend of plasticizers is present in the resin layer in an amount of at least 65 phr, and the resin layer has a tan δ of at least 1.2, or the blend of plasticizers is present in the said resin layer in an amount of at least 70 phr and the resin layer has a tan δ of at least 1.3.

In further embodiments, the interlayer comprises a second resin layer adjacent the first resin layer.

In embodiments, the poly(vinyl acetal) resin has a weight average molecular weight, Mw, of at least 350,000 Daltons, or at least 360,000 Daltons, or at least 370,000 Daltons, or at least 380,000 Daltons, or at least 390,000 Daltons, or at least 400,000 Daltons or more.

As used herein, the terms "polymer resin composition", "polymer composition" and "resin composition" refer to compositions that include one or more polymer resins. Polymer compositions may optionally include other components, such as plasticizers and/or other additives. As used herein, the terms "polymer resin layer", "polymer layer" and "resin layer" refer to one or more polymer resins, optionally combined with one or more plasticizers, that have been formed into a polymeric sheet. Again, resin layers may include one or more additional additives. As used herein, the term "interlayer" refers to a single or multiple layer polymer sheet suitable for use with at least one rigid substrate to form a multiple layer panel. The terms "single-sheet" and "monolithic" interlayer refer to interlayers formed of one single resin sheet, while the terms "multiple layer" and "multi-layer" interlayer refer to interlayers having two or more resin sheets that are coextruded, laminated, or otherwise coupled to one another.

Resin compositions, layers, and interlayers according to various embodiments of the present invention can include at least one poly(vinyl acetal) resin. Poly(vinyl acetal) resins can be formed by aqueous or solvent-based acetalization of poly(vinyl alcohol) with one or more aldehydes in the presence of an acid catalyst. The resulting resin can then be separated, stabilized, and dried according to known methods such as, for example, those described in U.S. Pat. Nos. 2,282,057 and 2,282,026, as well as Wade, B. 2016, Vinyl Acetal Polymers, Encyclopedia of Polymer Science and Technology. 1-22 (online, copyright 2016 John Wiley & Sons, Inc.). The total amount of residual aldehyde groups, or residues, present in the resulting poly(vinyl acetal) resin can be at least about 50, at least about 60, at least about 70, at least about 75, at least about 80, at least about 85, at least about 90, at least about 92 weight percent, as measured by ASTM D1396. The total amount of aldehyde residues in a poly(vinyl acetal) resin can be collectively referred to as the acetal component, with the balance of the poly(vinyl acetal) resin comprising residual hydroxyl or acetate groups, which will be discussed in further detail below.

When the poly(vinyl acetal) resin is a conventional poly (vinyl n-butyral) (PVnB) resin, greater than 90, at least about 95, at least about 97, or at least about 99 percent, by weight, of the acetal component, or total aldehyde residues, may comprise residues of n-butyraldehyde. Additionally, a conventional poly(vinyl n-butyral) resin may comprise less than 10, not more than about 5, not more than about 2, not more than about 1, or not more than about 0.5 weight percent of residues of an aldehyde other than n-butyraldehyde, based on the total weight of aldehyde residues of that resin.

Resins, compositions, layers, and interlayers according to embodiments of the present invention can include at least one poly(vinyl acetal) resin that comprises at least about 10 weight percent of residues of an aldehyde other than n-butyraldehyde. In some embodiments, the poly(vinyl acetal) resin may include at least about 15, at least about 20, at least about 30, at least about 40, at least about 50, at least about 60, at least about 70, at least about 80, at least about 90, at least about 95, or at least about 99 weight percent of residues of an aldehyde other than n-butyraldehyde, based on the total weight of aldehyde residues of the poly(vinyl acetal) resin. This resin may also include not more than about 10, not more than about 5, not more than about 2, or not more than about 1 weight percent of residues of n-butyraldehyde, based on the total weight of aldehyde residues of the poly(vinyl acetal) resin.

When the poly(vinyl acetal) resin includes residues of one or more aldehydes other than n-butyraldehyde, any suitable branched aliphatic or aromatic aldehyde that is a branched molecule containing less than 2 α-hydrogens may be used. Any aliphatic or aromatic aldehyde that has one or more branches at the alpha-carbon may be suitable. The aldehyde may be for example, an aldehyde having between 4 and 12 carbon atoms per molecule (i.e., a $C_4$ to $C_{12}$ aldehyde except n-butyraldehyde). Examples of suitable aldehydes other than n-butyraldehyde can include, but are not limited to, i-butyraldehyde, pivalaldehyde, 2-ethylhexyl aldehyde, hydroxy pivalaldehyde, benzaldehyde, and combinations thereof. In some embodiments, the aldehyde other than n-butyraldehyde can be selected from the group consisting of i-butyraldehyde, pivalaldehyde, and α-substituted aldehydes such as 2-methylbutyraldehyde, 2-methylhexaldehyde and the like, and combinations thereof, while, in some embodiments, the aldehyde other than n-butyraldehyde can be selected from the group consisting of i-butyraldehyde, pivalaldehyde, and combinations thereof. Any of these aldehydes will produce low VOC resins. In embodiments, the aldehyde will be commercially available and economically viable having a cost similar to or less than that of commercially available n-butyraldehyde.

According to various embodiments, the resin composition, layer, or interlayer may also include a poly(vinyl acetal) resin comprising residues of n-butyraldehyde. In some embodiments, these residues of n-butyraldehyde may be present in the same resin having residues of an aldehyde other than n-butyraldehyde, thereby forming a single "hybrid" resin with multiple aldehyde residues. In other embodiments, the n-butyraldehyde residues may be present on a second poly(vinyl acetal) resin physically blended with the first poly(vinyl acetal) resin that includes residues of an aldehyde other than n-butyraldehyde, and the blend can be present in the composition, layer, or interlayer. Typically, for every blend of resins, an equivalent single hybrid poly(vinyl acetal) resin also exists that may be substituted for the blend with similar results.

When the resin, composition, layer, or interlayer includes a single hybrid resin having residues of different aldehydes or a physical blend of a first poly(vinyl acetal) resin comprising residues of an aldehyde other than n-butyraldehyde and a second poly(vinyl acetal) resin comprising residues of n-butyraldehyde, the residues of the aldehyde other than n-butyraldehyde and the residues of n-butyraldehyde may each be present in the resin in an amount of at least about 1, at least about 2, at least about 3, at least about 4, at least about 5, at least about 10, at least about 15, at least about 20, at least about 25, at least about 30, at least about 35, at least about 40, or at least about 45 percent, based on the total weight of the aldehyde residues of the single resin. The combined amount of these two residues can comprise at least about 40, at least about 50, at least about 60, at least about 70, at least about 80, or at least about 90 percent of the total weight of the aldehyde residues of the resin. In embodiments, it is beneficial to have at least about 5 weight percent residues of an aldehyde in order for it to influence the particular properties. In some embodiments, the ratio, by weight, of residues of the n-butyraldehyde to the aldehyde other than n-butyraldehyde residues can be at least about 5:95, at least about 10:90, at least about 15:85, at least about 25:75, at least about 30:70, at least about 40:60 and/or not more than about 99:1, not more than about 95:5, not more than about 90:10, not more than about 85:15, not more than about 75:25, not more than about 70:30, not more than about 60:40, or in the range of from about 5:95 to about 95:5, about 10:90 to about 90:10, about 15:85 to about 85:15, about 25:75 to about 75:25, about 30:70 to about 70:30, or about 40:60 to about 60:40, or the residues of the aldehyde other than n-butyraldehyde can be present in the poly(vinyl acetal) resin in an amount of at least about 5, at least about 10, at least about 15, at least about 25, at least about 30, or at least about 40 weight percent, based on the combined weight of the residues of the aldehyde other than n-butyraldehyde and the residues of n-butyraldehyde.

In embodiments, branched aldehydes, such as those having methyl branching at the α-carbon, may be used. Branching at the α-carbon imparts in the polymer or interlayer a "high flow" attribute under extrusion or autoclave conditions when all other factors are kept constant. Stated differently, having an aldehyde with branching at the α-carbon provides an interlayer having improved flow properties.

Poly(vinyl acetal) polymers produced using i-butyraldehyde tend to be less polar compared to a poly(vinyl acetal) polymer produced using n-butyraldehyde with the same residual hydroxyl level. The steric effects introduced by the branching at the α-carbon effectively mask the residual hydroxyl groups and reduce the polarity of the polymer. Increasing the branching at the α-carbon introduces further steric hindrance, and makes the polymer even less polar. For instance, a poly(vinyl acetal) polymer produced using pivalaldehyde has three methyl groups attached to the α-carbon, and has a cloud point temperature that is even lower than that of a poly(vinyl acetal) produced using i-butyraldehyde at the same residual hydroxyl level. In addition, shorter side groups allow the polymer chains to get closer to each other forming a more tightly packed matrix. The net result is a resin or polymer that is less hydrophilic, more resistant to moisture and stiffer than the conventional poly(vinyl acetal) polymer made using n-butyraldehyde, and the resulting resin can be used in applications where higher stiffness is desired. Such resins also tend to produce higher and broader tan delta (δ) peak which is indicative of higher energy dissipation potential, and the resulting resin can be used where enhanced vibrational damping is required.

In embodiments, it is beneficial to have a poly(vinyl acetal) resin that comprises aldehydes containing less than two α-hydrogens (such as i-butyraldehyde). For example, poly(vinyl acetal) resins made with i-butyraldehyde or other aldehydes containing less than two α-hydrogens have superior compatibility with a wide range of commonly used plasticizers compared to other poly(vinyl acetal) resins made with other aldehydes containing two or more α-hydrogens. These improved resins have high intrinsic stiffness yet superior melt flow compared to resins with two or more α-hydrogens, a combination of properties that are ideal for structural glazing applications that require interlayers with a glass transition temperature of more than 40° C. Additionally, these improved resins have higher moisture resistance and superior energy dissipation potential compared to more conventional poly(vinyl acetal) resins, such as those made from aldehydes such as n-butyraldehyde.

Under strongly basic conditions iso-butyraldehyde can undergo a reversible self-aldol reaction to form iso-butyraldol or 2,2,4-trimethyl-3-hydroxypentanal. The only α-hydrogen in iso-butyraldehyde is much less acidic than the two α-hydrogens in n-butyraldehyde, and a self-aldol reaction of iso-butyraldehyde would require a stronger base, such as one stronger than hydroxide, to proceed to any appreciable degree.

Examples of iso-butyraldol and n-butyraldol are shown below. Iso-butyraldol (2,2,4-trimethyl-3-hydroxypentanal) is:

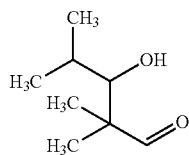

and n-butyraldol (2-ethyl-3-hydroxyhexanal) is:

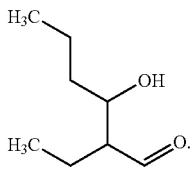

Unlike n-butyraldol, iso-butyraldol does not have any α-hydrogen left. Consequently, it cannot dehydrate to form a stable conjugated aldehyde like 2-ethyl-2-hexenal (2EH), which is undesirable in some circumstances. Pivalaldehyde does not have any α-hydrogens at all, therefore it cannot participate in a self-aldol reaction at all and there is no remaining product.

The 2-ethyl-2-hexenal (2EH) is a relatively stable molecule with a normal boiling point of approximately 175° C., and it is sparingly soluble in water and exhibits an affinity to the polymer. As a result, once formed it is difficult to remove it from the polymer via the conventional process involving washing with water, dewatering and drying operations. In embodiments, the normal concentration of 2EH often ranges between 4,000 and 10,000 ppm (by weight) in poly(vinyl acetal) resin, such as poly(vinyl n-butyral) resin, when the target residual hydroxyl level is less than 11 wt. %. This amount can constitute a significant fraction of all organic volatile compounds in the dried poly(vinyl acetal) resin. The concentration of 2EH in poly(vinyl acetal) resins can range between 1,400 and 2,400 ppm (by weight) even when the target residual hydroxyl level is higher (such as about 18.7 wt. %).

The presence of higher amounts of VOCs in the poly (vinyl acetal) resin can lead to number of quality issues in laminated products including but not limited to edge bubbles. Besides the higher concentration of 2EH, there is often a butyraldehyde yield loss. For example, when the concentration of 2EH is close to 10,000 ppm, the butyraldehyde yield loss can have significant impact on the manufacturing cost of the resin due to the amount of lost raw material. Additionally, under oxidative conditions, residual butyraldehyde, 2EH and other derivatives may contribute to formation of butyric acid which, in turn, may promote thermal oxidative degradation of the resin. Reducing the levels of 2EH and other residual materials provides improved products and lowers the VOC content.

In addition to residues of one or more aldehydes, the poly(vinyl acetal) resins described herein may also include residual hydroxyl and/or residual acetate groups. As used herein, the terms "residual hydroxyl content" and "residual acetate content" refer to the amount of polyvinyl hydroxyl and polyvinyl acetate groups, respectively, that remain on a resin after processing is complete. For example, poly(vinyl acetal) can be produced by hydrolyzing poly(vinyl acetate) to poly(vinyl alcohol), and then acetalizing the poly(vinyl alcohol) with an aldehyde to form poly(vinyl acetal). In the process of hydrolyzing the poly(vinyl acetate), not all of the acetate groups are converted to hydroxyl groups, and residual acetate groups remain on the resin. Similarly, in the process of acetalizing the poly(vinyl alcohol), not all of the hydroxyl groups are converted to acetal groups, which also leaves residual hydroxyl groups on the resin. As a result, most poly(vinyl acetal) resins include both residual hydroxyl groups (as vinyl hydroxyl, PVOH, groups) and residual acetate groups (as vinyl acetate, PVAc, groups) as part of the polymer chain. The residual hydroxyl content and residual acetate content are expressed in weight percent, based on the weight of the polymer resin, and are measured according to ASTM D1396.

In various embodiments, the residual hydroxyl content may be any level that is desired and appropriate for the application and properties. In embodiments, one or more of the poly(vinyl acetal) resins present in a composition, layer, or interlayer may have a residual hydroxyl content of at least about 8, at least about 10, at least about 12, at least about 14 or more and/or not more than about 45, not more than about 44, not more than about 43, not more than about 42, not more than about 41, not more than about 40, measured as described previously. In embodiments, one or more of the poly(vinyl acetal) resins present in a composition, layer, or interlayer may have a residual hydroxyl content of from about 8 to about 14, or about 9 to about 12 weight percent as resins having lower residual hydroxyl contents often have higher VOC levels.

When two or more poly(vinyl acetal) resins are present in a resin composition, layer, or interlayer as described herein, one or more of the resins can have a residual hydroxyl content different from the residual hydroxyl content of one or more of the other resins. For example, when a resin composition, layer, or interlayer includes a first poly(vinyl acetal) resin and a second poly(vinyl acetal) resin, at least one of the resins can have a residual hydroxyl content that is different from the other(s). In some embodiments, at least one of the resins can have a residual hydroxyl content that is at least 2 weight percent different than the other. As used herein, the terms "weight percent different" and "the difference . . . is at least . . . weight percent" refer to a difference between two given weight percentages, calculated by subtracting one number from the other number. For example, a poly(vinyl acetal) resin having a residual hydroxyl content of 12 weight percent and a poly(vinyl acetal) resin having a residual hydroxyl content of 14 weight percent have a weight percent difference of 2. As used herein, the term "different" encompasses values that are both higher and lower than another value.

The resin compositions, layers, and interlayers according to various embodiments of the present invention can further include at least one plasticizer. Depending on the specific composition of the resin or resins in a composition, layer, or interlayer, there may be no plasticizer, or the plasticizer may be present in an amount of at least about 1, at least about 2, at least about 3, at least about 4, at least about 5, at least about 10, at least about 15, at least about 20, at least about 25, at least about 30, at least about 35, at least about 40, at least about 45, at least about 50, at least about 55, at least about 60, at least about 65, at least about 70, at least about 75, at least about 80, at least about 90, at least about 95, at least about 100 or more parts per hundred parts of resin (phr), although different amounts may be selected depending on the desired properties and applications.

As used herein, the term "parts per hundred parts of resin" or "phr" refers to the amount of plasticizer present as compared to one hundred parts of resin, on a weight basis. For example, if 30 grams of plasticizer were added to 100 grams of a resin, the plasticizer would be present in an amount of 30 phr. If the resin composition, layer, or interlayer includes two or more resins, the weight of plasticizer is compared to the combined amount of the resins present to determine the parts per hundred resin. If the resin composition, layer, or interlayer includes two or more plasticizers, the weight of each plasticizer is compared to the combined amount of the resins present to determine the parts per hundred resin for that plasticizer. Further, when the plasticizer content of a layer or interlayer is provided herein, it is provided with reference to the amount of plasticizer in the mix or melt that was used to produce the layer or interlayer.

Examples of suitable plasticizers can include, but are not limited to, triethylene glycol di-(2-ethylhexanoate) ("3GEH"), triethylene glycol di-(2-ethylbutyrate), triethylene glycol diheptanoate, tetraethylene glycol diheptanoate, tetraethylene glycol di-(2-ethylhexanoate) ("4GEH"), polyethylene glycol bis(2-ethylhexanoate), dipropylene glycol dibenzoate, dihexyl adipate, dioctyl adipate, hexyl cyclohexyladipate, diisononyl adipate, heptylnonyl adipate, di(butoxyethyl) adipate, and bis(2-(2-butoxyethoxy)ethyl) adipate, dibutyl sebacate, dioctyl sebacate, and mixtures thereof. The plasticizer may be selected from the group consisting of triethylene glycol di-(2-ethylhexanoate), tetraethylene glycol di-(2-ethylhexanoate), and combinations thereof. In some embodiments, at least two plasticizers may be present in the compositions, layers, and interlayers described herein, with one of the plasticizers enhancing the compatibility of one or more other plasticizers in the composition.

Suitable plasticizers also include high refractive index plasticizers ("high RI plasticizer"). As used herein, the term "high RI plasticizer," refers to a plasticizer having a refractive index of at least 1.460, measured as described previously. The high RI plasticizers suitable for use can have a refractive index of at least about 1.470, at least about 1.480, at least about 1.490, at least about 1.500, at least about 1.510, at least about 1.520 and/or not more than about 1.600, not more than about 1.575, or not more than about 1.550, measured as discussed above. The refractive index of the high RI plasticizers may be in the range of from about 1.460 to about 1.600, about 1.470 to about 1.575, about 1.480 to about 1.550, about 1.490 to about 1.525.

Examples of types or classes of high RI plasticizers can include, but are not limited to, polyadipates (RI of about 1.460 to about 1.485); epoxides such as epoxidized soybean oils (RI of about 1.460 to about 1.480); phthalates and terephthalates (RI of about 1.480 to about 1.540); benzoates and toluates (RI of about 1.480 to about 1.550); and other specialty plasticizers (RI of about 1.490 to about 1.520). Specific examples of suitable RI plasticizers can include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, butoxyethyl benzoate, butoxyethyoxyethyl benzoate, butoxyethoxyethoxyethyl benzoate, propylene glycol dibenzoate, 2,2,4-trimethyl-1,3-pentanediol dibenzoate, 2,2, 4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexanoate), di-(butoxyethyl) terephthalate, di-(butoxyethyoxyethyl) terephthalate, and mixtures thereof. The high RI plasticizer may be selected from dipropylene glycol dibenzoate and tripropylene glycol dibenzoate, and/or 2,2,4-trimethyl-1,3-pentanediol dibenzoate.

Some high RI plasticizers, such as benzoate plasticizers, also have higher polarity than some of the conventional plasticizers. The polarity can be expresses by the formula $(100 \times O)/(C+H)$. In embodiments, it is desirable to have a plasticizer whose polarity, as expressed by the above formula, is greater than about 9.4.

When the resin, composition, layer or interlayer includes a high RI plasticizer, the plasticizer can be present in the layer alone or it can be blended with one or more additional plasticizers. The other plasticizer or plasticizers may also comprise high RI plasticizers, or one or more may be a lower RI plasticizer having a refractive index of less than 1.460. In some embodiments, the lower RI plasticizer may have a refractive index of less than about 1.450, less than about 1.445, or less than about 1.442 and can be selected from the group listed previously. When a mixture of two or more plasticizers are employed, the mixture can have a refractive index within one or more of the above ranges.

In embodiments, the poly(vinyl acetal) resin (or resins) of the present disclosure has a molecular weight of greater than about 350,000 Daltons, or about 400,000 Daltons, or about 450,000, or about 500,000 Daltons, as measured by size exclusion chromatography using low angle laser light scattering. As used herein, the term "molecular weight" means the weight average molecular weight.

One or more resin compositions, layers, and interlayers described herein may include various other additives to impart particular properties or features to the interlayer. Such additives can include, but are not limited to, adhesion control agents ("ACAs"), dyes, pigments, stabilizers such as ultraviolet stabilizers, antioxidants, anti-blocking agents, flame retardants, IR absorbers or blockers such as indium tin oxide, antimony tin oxide, lanthanum hexaboride ($LaB_6$) and cesium tungsten oxide, processing aides, flow enhancing additives, lubricants, impact modifiers, nucleating agents, thermal stabilizers, UV absorbers, dispersants, surfactants, chelating agents, coupling agents, adhesives, primers, reinforcement additives, and fillers.

When two or more poly(vinyl acetal) resins are utilized in a resin composition, layer, or interlayer, and at least one of the resins has a residual hydroxyl and/or acetate content different from one or more other resins, the differences may be selected to control or provide certain performance properties, such as strength, impact resistance, penetration resistance, processability, or acoustic performance to the final composition, layer, or interlayer. For example, poly(vinyl acetal) resins having a higher residual hydroxyl content, such as greater than about 14 weight percent, can facilitate increased impact resistance, penetration resistance, and strength to a resin composition or layer, while lower hydroxyl content resins, such as having a residual hydroxyl content of less than 13 weight percent, can improve the acoustic performance of the interlayer or blend.

Poly(vinyl acetal) resins having higher or lower residual hydroxyl contents and/or residual acetate contents, when combined with at least one plasticizer, ultimately include different amounts of plasticizer. As a result, different layers within a multilayered interlayer, for example, may have different properties. Although not wishing to be bound by theory, it is understood that the compatibility of a given plasticizer with a poly(vinyl acetal) resin can depend, at least in part, on the composition of the polymer, and, in particular, on its residual hydroxyl content. Overall, poly(vinyl acetal) resins with higher residual hydroxyl contents tend to exhibit a lower compatibility (or capacity) for a given plasticizer as compared to similar resins having a lower residual hydroxyl content. As a result, poly(vinyl acetal) resins with higher residual hydroxyl contents tend to be less plasticized and exhibit higher stiffness than similar resins having lower residual hydroxyl contents. Conversely, poly(vinyl acetal) resins having lower residual hydroxyl contents may tend to, when plasticized with a given plasticizer, incorporate higher amounts of plasticizer, which may result in a softer resin layer that exhibits a lower glass transition temperature than a similar resin having a higher residual hydroxyl content. Depending on the specific resin and plasticizer, however, these trends could be reversed.

When two poly(vinyl acetal) resins having different levels of residual hydroxyl content are blended with a plasticizer, the plasticizer may partition between the resin layers or domains, such that more plasticizer can be present in the layer or domain having the lower residual hydroxyl content and less plasticizer may be present in the layer or domain having the higher residual hydroxyl content. Ultimately, a state of equilibrium is achieved between the two resins. The correlation between the residual hydroxyl content of a poly(vinyl acetal) resin and plasticizer compatibility/capacity can facilitate addition of a proper amount of plasticizer to the polymer resin. Such a correlation also helps to stably maintain the difference in plasticizer content between two or more resins when the plasticizer would otherwise migrate between the resins. In embodiments, two or more different resins may be blended to form a composition, layer or interlayer as long as the total concentration of self-aldol condensation product is less than 100 ppm.

In some embodiments, when the resin layer or interlayer includes at least a first resin layer comprising a first poly(vinyl acetal) resin and a first plasticizer, and a second resin layer, adjacent to the first resin layer, comprising a second poly(vinyl acetal) resin and a second plasticizer, the resin layers may have different plasticizer contents. For example, the difference in plasticizer content between the resin layers can be at least about 2, at least about 5, at least about 8, at least about 10, at least about 12, or at least about 15 phr or more.

In some embodiments, when the resin layer or interlayer includes at least a first resin layer comprising a first poly(vinyl acetal) resin and a first plasticizer, and a second resin layer, adjacent to the first resin layer, comprising a second poly(vinyl acetal) resin and a second plasticizer, the resin layers may have different glass transition temperatures. The difference in the glass transition temperature of a first resin layer and the glass transition temperature of a second resin layer can be at least about 2, at least about 3, at least about 4, at least about 5, at least about 8, at least about 10, at least about 12, at least about 15, at least about 18, at least about 20, at least about 22, or at least about 25° C. or more. In embodiments, one of the first and second resin layers can have a glass transition temperature of at least about 28, at least about 29, at least about 30, at least about 33, at least about 35, at least about 37° C. or more. The other of the first and second poly(vinyl acetal) resin layers can have a glass transition temperature of less than 10, or less than 5, or less than 0, or less than −2, or even less than −5° C.

As previously stated, according to various embodiments of the present invention, resin compositions, layers, and interlayers as described herein that include at least one poly(vinyl acetal) resin having residues of an aldehyde other than n-butyraldehyde as described herein may have lower amounts of VOCs than conventional poly(vinyl acetal) resins with n-butyraldehyde and other aldehydes. The lower VOCs may help improve properties of an interlayer and laminate containing the resin composition. Poly(vinyl acetals) having residues of an aldehyde other than n-butyraldehyde as described herein can also benefit non-interlayer applications such as coatings, inks and adhesives by minimizing strong odors and maintaining indoor air quality.

For example, in some embodiments, poly(vinyl acetal) resins including residues of aldehydes other than n-butyraldehyde may have a lower amount of VOCs or other impurities than a comparable poly(vinyl n-butyral) resin. As used herein, the term "comparable poly(vinyl n-butyral) resin" refers to a poly(vinyl acetal) resin having the same residual acetal, residual hydroxyl, and acetate content as a given poly(vinyl acetal) resin, but that includes an acetal component including only residues of n-butyraldehyde.

In some embodiments, the resin layer or interlayer including at least one poly(vinyl acetal) resin having residues of an aldehyde other than n-butyraldehyde may also exhibit enhanced properties, such as, for example, improved edge stability, reduced formation of edge bubbles, as well as other improvements due to the reduced VOC levels. In the resin process, the reduced VOC levels translate to higher raw material yields, reduced unit costs, improved efficiencies, and the like.

As discussed previously, poly(vinyl acetal) resins comprising residues of an aldehyde other than n-butyraldehyde may, in some embodiments, be physically mixed with a poly(vinyl n-butyral) resin or may further include resins of n-butyraldehyde. Such combinations, which include a first poly(vinyl acetal) resin component and a second poly(vinyl acetal) resin component, may also exhibit unexpected properties, including lower VOCs or other impurities, and others. As used herein, the term "poly(vinyl acetal) resin component," refers either to an individual poly(vinyl acetal) resin present in a blend of resins or to an acetal moiety present on a single poly(vinyl acetal) resin. In some embodiments of the present invention, a blend of first and second poly(vinyl acetal) resin components may not only exhibit properties different than each individual component, but may also exhibit properties unexpected for the combination.

When a resin layer or interlayer includes at least one poly(vinyl acetal) resin including residues of an aldehyde other than n-butyraldehyde, the layer or interlayer may also exhibit unexpected or enhanced properties, as compared to a comparable resin layer formed from a poly(vinyl n-butyral) resin and a plasticizer of the same type and in the same amount. As used herein, the term "comparable poly(vinyl n-butyral) resin layer," refers to a resin layer formed using a comparable poly(vinyl n-butyral) resin, as defined previously, and a plasticizer of the same type and in the same amount as a given layer.

The resins or blended resins can be formed into one or more resin layers according to any suitable method. Exemplary methods of forming polymer layers and interlayers can include, but are not limited to, solution casting, compression molding, injection molding, melt extrusion, melt blowing, and combinations thereof. Multilayer interlayers including two or more resin layers may also be produced according to any suitable method such as, for example, co-extrusion, blown film, melt blowing, dip coating, solution coating, blade, paddle, air-knife, printing, powder coating, spray coating, and combinations thereof. In various embodiments of the present invention, the layers or interlayers may be formed by extrusion or co-extrusion. In an extrusion process, one or more thermoplastic polymers, plasticizers, and, optionally, at least one additive, can be pre-mixed and fed into an extrusion device. Other additives, such as ACAs, colorants, and UV inhibitors, which can be in liquid, powder, or pellet form, may also be used and may be mixed into the thermoplastic polymers or plasticizers prior to entering the extrusion device. These additives can be incorporated into the polymer resin and, by extension, the resultant polymer sheet, thereby enhancing certain properties of the polymer layer or interlayer and its performance in the final multiple layer glass panel or other end product.

In various embodiments, the thickness, or gauge, of any of the layers or interlayers can be at least about 2, at least about 5, at least about 10, at least about 15, at least about 20 mils and/or not more than about 120, not more than about 100, not more than about 90, not more than about 60, not more than about 50, or not more than about 35 mils, or it can be in the range of from about 2 to about 120, about 10 to about 100, about 15 to about 60, or about 20 to about 35 mils, although other thicknesses may be appropriate depending on the desired properties and/or application. In millimeters, the thickness of the polymer layers or interlayers can be at least about 0.05, at least about 0.13, at least about 0.25, at least about 0.38, at least about 0.51 mm and/or not more than about 2.74, not more than about 2.54, not more than about 2.29, not more than about 1.52, or not more than about 0.89 mm, or in the range of from about 0.05 to 2.74, about 0.25 to about 2.54 mm, about 0.38 to about 1.52 mm, or about 0.51 to about 0.89 mm, although other thicknesses may be appropriate depending on the desired properties and/or application.

In some embodiments, the resin layers or interlayers can comprise flat polymer layers having substantially the same thickness along the length, or longest dimension, and/or width, or second longest dimension, of the sheet, while, in other embodiments, one or more layers of a multilayer interlayer, for example, can be wedge-shaped or can have a wedge-shaped profile, such that the thickness of the interlayer changes along the length and/or width of the sheet, such that one edge of the layer or interlayer has a thickness greater than the other. When the interlayer is a multilayer interlayer, at least one, at least two, or at least three of the layers of the interlayer can be wedge-shaped. When the interlayer is a monolithic interlayer, the polymer sheet can be flat or wedge-shaped. Wedge-shaped interlayers may be useful in, for example, heads-up-display (HUD) panels in automotive and aircraft applications.

The resin compositions, layers, and interlayers according to embodiments of the present invention may be utilized in a multiple layer panel that comprises a resin layer or interlayer and at least one rigid substrate. The rigid substrate(s) may be any rigid substrate, and in embodiments, may be a transparent substrate(s). Any suitable rigid substrate may be used and in some embodiments may be selected from the group consisting of glass, polycarbonate, biaxially oriented PET, copolyesters, acrylic, and combinations thereof. In some embodiments, when the rigid substrate(s) is a glass substrate, it may be selected from the group consisting of flat glass, float glass, warped glass, wavy glass, tempered glass, heat-strengthened glass, bent glass, chemically tempered glass, and combinations thereof. When the rigid substrate includes a polymeric material, the polymeric material may or may not include a hard coat surface layer as desired. In some embodiments, the multilayer panels include a pair of rigid substrates with the interlayer(s) disposed therebetween. The panels can be used for a variety of end use applications, including, for example, for automotive windshields and windows, aircraft windshields and windows, panels for various transportation applications such as marine applications, rail applications, etc., structural architectural panels such as windows, doors, stairs, walkways, balusters, balustrades, decorative architectural panels, weather-resistant panels, such as hurricane glass or tornado glass, ballistic panels, and other similar applications.

When laminating the resin layers or interlayers between two rigid substrates, such as glass, the process can include at least the following steps: (1) assembly of the two substrates and the interlayer; (2) heating the assembly via an IR radiant or convective device for a first, short period of time; (3) passing the assembly into a pressure nip roll for the first de-airing; (4) heating the assembly for a short period of time (such as at a temperature of about 60° C. to about 120° C.) to give the assembly enough temporary adhesion to seal the edge of the interlayer; (5) passing the assembly into a second pressure nip roll to further seal the edge of the interlayer and allow further handling; and (6) autoclaving the assembly (such as at a temperature between 135° C. and 150° C. and pressures between 150 psig and 200 psig for about 30 to 90 minutes or other conditions as appropriate and known to one of skill in the art). Other methods for de-airing the interlayer-glass interface, as described according to some embodiments in steps (2) through (5) above include vacuum bag and vacuum ring processes, and both may also be used to form interlayers of the present invention as described herein.

According to some embodiments wherein the resin compositions and layers described previously are used to form interlayers, the interlayers may also exhibit one or more improved or enhanced properties. The interlayers can comprise single, or monolithic, interlayers, or interlayers having at least a pair of adjacent resin layers. In some embodiments, the interlayers can include three or more resin layers with at least a first, second, and third resin layer, with the second resin layer sandwiched between the first and third. When the interlayer includes two or more resin layers, adjacent resin layers can comprise different poly(vinyl acetal) resins, and can have one or more properties that differ from each other. In some embodiments, the poly(vinyl acetal) resins present in adjacent layers may have different residual hydroxyl and/or acetal contents that differ from each other by an amount within the ranges provided above, and may comprise the same or different aldehyde residues.

Interlayers according to various embodiments of the present invention exhibit optimized or enhanced optical properties. Clarity is one parameter used to describe the optical performance of blends or compositions, layers, and interlayers described herein and may be determined by measuring haze value or percent. Haze value represents the quantification of light scattered by a sample in contrast to the incident light. In some embodiments, the resin blends, layers, and interlayers described herein may have a haze value of less than 5 percent, less than about 4 percent, less than about 3 percent, less than about 2 percent, less than about 1, or less than about 0.5 percent, as measured in accordance with ASTM D1003-61 (reapproved 1977)—Procedure A using Illuminant C, at an observer angle of 2 degrees. The test is performed with a hazemeter, such as a Model D25 Hazemeter commercially available from Hunter Associates (Reston, Va.), on a polymer sample which has been laminated between two sheets of clear glass, each having a thickness of 2.3 mm (commercially available from Pittsburgh Glass Works of Pennsylvania).

Tan delta is the ratio of the loss modulus (G") in Pascals to the storage modulus (G') in Pascals of a specimen measured by Dynamic Mechanical Thermal Analysis (DMTA). The DMTA is performed with an oscillation frequency of 1 Hz under shear mode and a temperature sweep rate of 3° C./min. The peak value of the G"/G' curve at the glass transition temperature is the tan delta value.

The following examples are intended to be illustrative of the present invention in order to teach one of ordinary skill in the art to make and use the invention and are not intended to limit the scope of the invention in any way.

EXAMPLES

The following Examples describe the preparation of several poly(vinyl acetal) resins having different aldehyde residues. As described below, the tests performed on the resins were used to evaluate both comparative and inventive materials.

Example 1

Several pure and mixed poly(vinyl acetal) resins were made using conventional lab techniques using 5 L or 12 L glass or high pressure Parr reactors. Each of the resins were produced via a solvent route. Although many choices exist, a preferred solvent can be a lower alcohol such as methanol or ethanol. The reaction was initiated by dispersing poly (vinyl alcohol) in the solvent. The poly(vinyl alcohol) is commercially available as a fine white powder from various suppliers, or alternatively it may be produced for captive consumption upstream in the process via hydrolysis of poly(vinyl acetate). The aldehyde (such as n-butyraldehyde or i-butyraldehyde) and a catalyst were charged to the jacketed reactor fitted with an agitator and a condenser. The reaction mixture was heated to reflux temperature, and held at that temperature to finish conversion. Poly(vinyl acetal) polymer remained in solution. The acid catalyst was neutralized with a strong base (such as sodium or potassium hydroxide), and the polymer was subsequently precipitated out by adding the solution to demineralized water under intense agitation. The poly(vinyl acetal) particles were washed with copious amounts of demineralized water to remove unreacted aldehyde and salts. At the end of the washing step, the slurry was filtered and the resin was dried in a lab fluidized bed dryer.

Prior to making the samples, a poly (vinyl iso-butyral) sample with a residual OH value of about 11.4 wt. % was tested for organic volatiles. The organic volatile species were extracted using a pentane/isopropyl acetate mixture before being analyzed by GC MS. The concentration of self-aldol product was reported to be 0.05 wt. %, which is almost an order of magnitude lower than that typically observed in a comparable poly(vinyl n-butyral) sample. A typical or comparable poly(vinyl n-butyral) sample has a concentration of self-aldol product of at least about 0.15 wt. %, at least about 0.16 wt. %, at least about 0.17 wt. %, at least about 0.18 wt. %, at least about 0.19 wt. %, at least about 0.20 wt. %, at least about 0.30 wt. %, at least about 0.35 wt. %, at least about 0.40 wt. %, at least about 0.45 wt. %, at least about 0.50 wt. %, at least about 0.55 wt. %, or at least about 0.60 wt. % or more.

Several poly(vinyl iso-butyral) (PViB) samples were produced at different target residual hydroxyl levels. Samples S-1 to S-4 had target residual hydroxyl values between 9.0 and 10.5 wt. %. Sample S-5 was a conventional PVnB resin with a target OH value of 11.5 wt. %. The samples were tested, and the average residual iso-butyraldehyde concentration in Samples S-1 to S-4 was less than 248 ppm (where the average concentration was determined by taking the individual iso-butyraldehyde content in Samples S-1 to S-4 shown in Table 1 and using a value of 100 ppm for Samples S-2 and S-3 since they are below the detectable limit, therefore, contained at most 100 ppm). In comparison, the residual concentration of n-butyraldehyde in Sample S-5 was 1022 ppm. This significantly higher concentration of n-butyraldehyde in Sample S-5 is due to the lower water solubility and higher boiling point of n-butyraldehyde compared to iso-butyraldehyde.

The most noteworthy difference between the PViB and PVnB samples was in the concentrations of the respective self-aldol condensation products. As described earlier, two molecules of n-butyraldehyde undergo self-aldol condensation reaction under strongly basic conditions to form the more stable 2-ethyl-2-hexenal (2EH). Sample S-5 contained 1,639 ppm of the self-aldol condensation product (2EH), which, as previously discussed, is a VOC and is undesirable. In contrast, Samples S-1 to S-4 did not contain measurable or detectable quantities of any self-aldol condensation product, as shown in Table 1 below. For the residual iso-butyraldehyde and n-butyraldehyde and the self-aldol condensation product measured, the detection limit is 100 parts per million (ppm).

TABLE 1

| Sample | OH Target (wt. %) | Iso-butyraldehyde (ppm) | n-butyraldehyde (ppm) | Self-aldol condensation product (ppm) |
|---|---|---|---|---|
| S-1 | 9.0 | 684** | BDL | BDL |
| S-2 | 9.0 | BDL | BDL | BDL |
| S-3 | 9.0 | BDL | BDL | BDL |
| S-4 | 10.5 | 106 | BDL | BDL |
| S-5 (control) | 11.5 | BDL | 1022 | 1639 |

*BDL—below detectable limit
**this amount may be inaccurate as it may not have been completely washed and the expected amount would be much lower Minimizing the formation of the self-aldol condensation product can help in producing poly(vinyl acetal) resins with low concentrations of VOCs. Any excess unreacted iso-butyraldehyde would remain as an aldehyde after further processing, such as varnish neutralization, which would allow it to be easily washed out in the downstream washing process and recovered for recycle and reuse. Iso-butyraldehyde is much more soluble in water and has a much lower propensity to stay with the polymer than a self-aldol condensation product (i.e., 2-ethyl-2-hexenal (2EH)). The lower boiling point and higher water solubility of iso-butyraldehyde compared to n-butyraldehyde also makes a wash more effective and improves the efficiency of the downstream drying operation to remove residual iso-butyraldehyde.

Example 2

In addition to the aldehyde and self-aldol condensation product (i.e., 2EH), trimers (for example, trimers that can be formed by reaction of n-butyraldehyde with itself or other species in the reaction) can also be present in the final poly(vinyl acetal) resin in significant amounts. FIG. 1 shows the variation in total trimer concentration plotted as a function of post-cook time for three different poly(vinyl acetal) experiments. Experiments E-1 and E-2 produced PVnB resin and experiment E-3 produced PViB resin. The post-cook time refers to the duration for which reactor contents were held at 70° C. prior to polymer precipitation. In each experiment, the concentration of trimers increased with time. The overall trimer levels were significantly lower for E-3 than for E-1 or E-2. Without wishing to be bound by theory, it is expected that the branching at the α-carbon plays a role in suppressing trimer formation as well. While the trimers have higher boiling points and may not be considered to be VOCs, it is still generally desirable to have a cleaner resin product (lower VOCs, trimers, etc.) with minimum by-product contaminants, such as the VOCs and trimers.

Furthermore, on account of their higher boiling points and lower water solubility, the self-aldol condensation products and the trimer species tend to stay with the resin, and cannot be recovered, contributing to raw material yield loss, which in the preferred conversion range, can be significant. As a result, avoidance of self-aldol condensation product and trimer formation has operational benefits in addition to superior finished product quality as discussed previously.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. For example, an interlayer can be formed comprising poly(vinyl butyral) having a residual hydroxyl content in any of the ranges given in addition to comprising a plasticizer in any of the ranges given to form many permutations that are within the scope of the present disclosure, but that would be cumbersome to list. Further, ranges provided for a genus or a category, such as phthalates or benzoates, can also be applied to species within the genus or members of the category, such as dioctyl terephthalate, unless otherwise noted.

What is claimed is:

1. A resin layer comprising a poly(vinyl acetal) resin having a low level of volatile organic compounds having a residual hydroxyl content of less than 14 weight percent and comprising at least 90 weight percent of residues of at least one branched aldehyde having less than two α-hydrogens, based on the total weight of aldehyde residues of the poly(vinyl acetal) resin, wherein the poly(vinyl acetal) resin has less than 100 parts per million (by weight) of a self-aldol condensation product, and a plasticizer.

2. The resin layer of claim 1, wherein the self-aldol condensation product is 2-ethyl-2-hexenal.

3. The resin layer of claim 1, wherein the aldehyde is iso-butyraldehyde or pivaldehyde.

4. The resin layer of claim 1, wherein the plasticizer comprises triethylene glycol di-(2-ethylhexanoate).

5. The resin layer of claim 4, further comprising a second plasticizer wherein the second plasticizer comprises a plasticizer having a polarity of greater than about 9.4, wherein polarity is expressed by the formula $100 \times O/(C+H)$, wherein O, C and H represent the number of oxygen, carbon and hydrogen atoms in the plasticizer.

6. The resin layer of claim 1, wherein the weight average molecular weight, Mw, of the poly(vinyl acetal) resin is at least 350,000 Daltons.

7. The resin layer of claim 1, wherein the plasticizer is present in an amount of at least 50 phr, and wherein the resin layer has a tan δ of at least 1.05.

8. The resin layer of claim 5, wherein the first and the second plasticizers together are present in an amount of at least 60 phr, and wherein the resin layer has a tan δ of at least 1.2.

9. The resin layer of claim 1, wherein the poly(vinyl acetal) resin has a residual hydroxyl content of less than or equal to 13.5 weight percent.

10. The resin layer of claim 1, wherein the aldehyde is iso-butyraldehyde or pivaldehyde.

11. The resin layer of claim 5, wherein the plasticizer is present in an amount of at least 70 phr.

12. The resin layer of claim 11, wherein the resin layer has a tan δ of at least 1.3.

* * * * *